(12) United States Patent
Lortz et al.

(10) Patent No.: US 8,529,651 B2
(45) Date of Patent: Sep. 10, 2013

(54) PROCESS FOR THE PRODUCTION OF METAL OXIDE AND METALLOID OXIDE DISPERSIONS

(75) Inventors: Wolfgang Lortz, Waechtersbach (DE); Christoph Batz-Sohn, Hanau (DE); Gabriele Perlet, Grosskrotzenburg (DE); Werner Will, Gelnhausen (DE); Gerrit Schneider, Hanau (DE)

(73) Assignee: Evonik Degussa GmbH, Essen (DE)

( * ) Notice: Subject to any disclaimer, the term of this patent is extended or adjusted under 35 U.S.C. 154(b) by 232 days.

(21) Appl. No.: 12/894,539

(22) Filed: Sep. 30, 2010

(65) Prior Publication Data

US 2011/0155951 A1 Jun. 30, 2011

Related U.S. Application Data

(63) Continuation of application No. 10/546,893, filed as application No. PCT/EP2004/003445 on Apr. 1, 2004, now abandoned.

(30) Foreign Application Priority Data

Apr. 14, 2003 (DE) .................................. 103 17 066

(51) Int. Cl.
*B24D 3/02* (2006.01)
*C09C 1/68* (2006.01)
*C09K 3/14* (2006.01)
*C01B 33/12* (2006.01)

(52) U.S. Cl.
USPC .......................................... 51/308; 423/335

(58) Field of Classification Search
USPC .................... 51/308; 423/335–340
See application file for complete search history.

(56) References Cited

U.S. PATENT DOCUMENTS

| | | | |
|---|---|---|---|
| 4,280,822 A | 7/1981 | Wason | |
| 6,103,209 A * | 8/2000 | Balducci et al. | 423/338 |
| 6,248,144 B1 | 6/2001 | Tamai et al. | |
| 6,808,769 B2 | 10/2004 | Batz-Sohn et al. | |
| 2001/0042493 A1 | 11/2001 | Scharfe et al. | |
| 2002/0121156 A1 | 9/2002 | Menzel et al. | |
| 2002/0134027 A1 | 9/2002 | Lortz et al. | |
| 2003/0095905 A1 | 5/2003 | Scharfe et al. | |
| 2004/0034144 A1 | 2/2004 | Scharfe et al. | |
| 2004/0106697 A1 | 6/2004 | Lortz et al. | |
| 2005/0169861 A1 | 8/2005 | Lortz et al. | |

OTHER PUBLICATIONS

Ystral Inline Dispersing machine Type Z 3.000 S/W3DGA-66, Ystral Inc., http://www.ystral.de/Englisch/Machines/InlineDisperser/Inline_Z66/inline_z66.html, printed Jan. 10, 2012.*
BPAI decision for U.S. Appl. No. 10/546,893, Mailed Jul. 30, 2010.*

* cited by examiner

*Primary Examiner* — Anthony J Zimmer
(74) *Attorney, Agent, or Firm* — Oblon, Spivak, McClelland, Maier & Neustadt, L.L.P.

(57) ABSTRACT

Process for the production of an aqueous dispersion of pyrogenically produced metal oxide and metalloid oxide powders with a BET surface area of between 5 and 600 m²/g, with a metal oxide or metalloid oxide content in the dispersion of between 5 and 25 wt. %, comprising the following steps:

water, which is optionally adjusted to pH values of between 2 and 4 by adding acids, is circulated from a receiving vessel via a rotor/stator machine, and metal oxide or metalloid oxide powder is introduced, using a feed device, into the shear zone between the slots in the rotor teeth and the stator slots, continuously or discontinuously and with the rotor/stator machine running, in a quantity such that a predispersion with a solids content of between 20 and 40 wt. % results, and, after all the metal oxide powder or metalloid oxide powder has been added, the feed device closes and shearing continues in such a way that the shear rate is in the range of between 10000 and 40000 s$^{-1}$, and then, by dilution, the predispersion is adjusted to the desired solids content of the dispersion while maintaining the dispersing conditions.

9 Claims, No Drawings

PROCESS FOR THE PRODUCTION OF METAL OXIDE AND METALLOID OXIDE DISPERSIONS

This is a continuation application of U.S. application Ser. No. 10/546,893, filed Aug. 24, 2005, which is a 371 of PCT/EP04/03445 filed on Apr. 1, 2004.

The invention provides a process for the production of low-viscosity, highly filled dispersions of pyrogenic metal oxides and metalloid oxides.

Low-viscosity, highly filled dispersions of pyrogenic metal oxides or metalloid oxides are widely used. For example, silica and aluminium dioxide dispersions are used in polishing processes (chemical-mechanical polishing) or in the paper industry for the production of a paper coating. In the glass industry, highly filled silica dispersions or dispersions of silicon-titanium mixed oxide are used for the production of shaped glass articles.

U.S. Pat. No. 5,116,535, U.S. Pat. No. 5,246,624 and U.S. Pat. No. 6,248,144 all describe processes for the production of low-viscosity dispersions of pyrogenic silicon dioxide powder (fumed silica).

Fumed silica powders are produced like other pyrogenic oxide powders, e.g. alumina or titanium dioxide, preferably by flame hydrolysis. In this process, a homogeneous mixture of a vaporous starting material of the subsequent oxide, e.g. silicon tetrachloride or aluminium chloride, is burnt with hydrogen, oxygen and an inert gas using a burner in a cooled combustion chamber. In a first step of this process, water is produced by the reaction of hydrogen and oxygen, and in a second step, this water hydrolyses the starting material with the formation of the pyrogenic oxide.

In this process, primary particles are initially formed, which can coalesce into aggregates as the reaction progresses. Aggregates here are primary particles that have fused together. The aggregates can cluster together further to form agglomerates. During the dispersing of pyrogenic oxide particles, even under the action of low dispersing energy, the agglomerates are first separated. With higher dispersing energies, larger aggregates are also converted to small aggregates.

The principle on which the documents U.S. Pat. No. 5,116,535, U.S. Pat. No. 5,246,624 and U.S. Pat. No. 6,248,144 are based is the same, i.e. to achieve as complete as possible a destructuring of the fumed silica powder by the action of high shear energies. However, in order to be able to introduce the high shear energies into the system, this must have a high viscosity. The high viscosity is achieved in the production processes of the above documents by a high level of filling of silica powder, which has to be at least 40 wt. %, and preferably 50 to 60 wt. %. If the content of silica powder in these processes is reduced to values of less than 40 wt. %, the effectiveness of the dispersing is reduced to such an extent that only incomplete destructuring of the silica powder takes place and larger aggregates remain in dispersion. This can lead to sedimentation or gelation of the dispersion. The dispersion is then adjusted to the desired solids content by dilution.

A disadvantage of these processes is the time- and energy-intensive incorporation of the pyrogenically produced silica powder to achieve the required viscosity.

In addition, there is a process for the dispersion of pyrogenically produced metal oxides in an aqueous medium, in which two predispersed suspension streams under high pressure are depressurised via two nozzles. These nozzles have to be adjusted in such a way that the dispersion jets hit one another exactly and the particles grind one another as a result.

This process for the production of dispersions containing pyrogenically produced silica is described e.g. in EP-A-773270.

In this process, an aqueous predispersion is divided into two partial streams, which are brought together again under high pressure. The particles grind one another during this process. In another embodiment, the predispersion is also placed under high pressure, but the collision of the particles takes place against armoured wall regions. Dispersion can take place over the entire pH range, the alkaline range being preferred. If a dispersion with a high solids content in the acidic range is desired, it is advantageous to reduce the viscosity by means of suitable additives.

The precise adjustment of the two predispersed suspension streams is problematic in this process. Only with precise adjustment can uniform grinding of the silica powder take place. A further complicating factor is that, under the extreme stress on the nozzles at pressures of up to 3500 kg/cm$^2$, these display marked wear, which has a negative effect on the above-mentioned adjustment and can lead to impurities entering the dispersion.

In the embodiment in which the collision of the particles takes place against armoured wall regions, it has been shown that the wall regions are subject to marked wear and this embodiment is not suitable for the dispersing of fumed silica.

It is true of both high-pressure processes that the dimensions of the equipment available do not allow larger quantities of dispersion to be produced inexpensively.

The object of the invention is to provide a process for the production of finely dispersed dispersions containing pyrogenically produced metal oxides as the solid phase, which avoids the disadvantages of the prior art. In particular, it should be possible to incorporate pyrogenically produced metal oxides or metalloid oxides into an aqueous phase as rapidly as possible, the introduction of impurities should be minimal and it should be possible to implement the process economically.

The object is achieved by a process for the production of an aqueous dispersion of pyrogenically produced metal oxide or metalloid oxide powders with a BET surface area of between 5 and 600 m$^2$/g, with a metal oxide or metalloid oxide content in the dispersion of between 5 and 25 wt. %, which comprises the following steps:

water, which is optionally adjusted to pH values of between 2 and 4 by adding acids, is circulated from a receiving vessel via a rotor/stator machine, and metal oxide powder or metalloid oxide powder is introduced, using a feed device, into the shear zone between the slots in the rotor teeth and the stator slots, continuously or discontinuously and with the rotor/stator machine running, in a quantity such that a predispersion with a solids content of between 20 and 40 wt. % results, and, after all the metal oxide powder or metalloid oxide powder has been added, the feed device closes and shearing continues in such a way that the shear rate is in the range of between 10000 and 40000 s$^{-1}$, and then, by dilution, the predispersion is adjusted to the desired solids content of the dispersion while maintaining the dispersing conditions.

In a preferred embodiment, the shear rate can be between 20000 and 30000 s$^{-1}$.

The process according to the invention can preferably be carried out with silica powder, alumina powder, doped silica powder, described e.g. in DE-A-19847161 or DE-A-10065028, or with silicon-aluminium mixed oxide powder, described e.g. in DE-A-4226711, DE-A-10135452, DE-A19919635 or US-A-2003/22081.

Furthermore, in the process according to the invention, bases and/or acids may be added to the dispersion and/or predispersion. As bases, for example ammonia, ammonium hydroxide, tetramethylammonium hydroxide, primary, secondary or tertiary organic amines, sodium hydroxide solution or potassium hydroxide solution may be used. As acids, for example phosphoric acid, sulfuric acid, hydrochloric acid, nitric acid or carboxylic acids may be used.

Furthermore, in the process according to the invention, cationic polymers and/or aluminium salts may be added to the dispersion and/or predispersion. Suitable cationic polymers may be those with at least one quaternary ammonium group, a phosphonium group, an acid adduct of a primary, secondary or tertiary amine group, polyethylene imines, polydiallylamines or polyallylamines, polyvinylamines, dicyandiamide condensates, dicyandiamide-polyamine co-condensates or polyamide-formaldehyde condensates. Suitable aluminium salts may be aluminium chloride, aluminium hydroxychlorides of the general formula Al(OH)$_x$Cl with x=2-8, aluminium chlorate, aluminium sulfate, aluminium nitrate, aluminium hydroxynitrates of the general formula Al(OH)$_x$NO$_3$ with x=2-8, aluminium acetate, alums such as aluminium potassium sulfate or aluminium ammonium sulfate, aluminium formates, aluminium lactate, aluminium oxide, aluminium hydroxide acetate, aluminium isopropylate, aluminium hydroxide, aluminium silicates and mixtures of the above compounds. The use of these aluminium compounds in the production of silica dispersions is already described in the German patent application with application number DE10238463.0.

It can also be advantageous to add to the dispersion and/or predispersion a surface-active substances, which is of a non-ionic, cationic, anionic or amphoteric nature.

Finally, one or more preservatives can also be added to the process according to the invention. These can, for example, be compounds that are available under the trade names Preventol® from Bayer or Acticide® from Thor.

EXAMPLES

Analytical Determinations

Determination of the viscosity of the dispersions: the viscosity of the dispersions produced was determined using a rotary rheometer from Physica, model 300, and the CC 27 measuring cup at 25° C. The viscosity value was determined at a shear rate of 10 s$^{-1}$ and 100 s$^{-1}$.

Determination of the particle size present in the dispersion: the particle size present in the dispersion is determined by dynamic light scattering. The instrument used is the Zetasizer 3000 HSa (Malvern Instruments, UK). The median value of the volume distribution d$_{50(v)}$ is given.

Determination of the shear rate: the shear rate in the process according to the invention is expressed as the peripheral speed divided by the distance between the surfaces.

The peripheral speeds can be calculated from the speed of the rotor and the rotor diameter. The distance between rotor and stator is approx. 1 mm in the dispersing devices used.

Dispersing devices used: the rotor/stator machines Conti-TDS 3 and Conti-TDS 4 from Ystral are used for dispersing.

Silica powders used: AEROSIL® 90 (approx. 90 m$^2$/g), AEROSIL® 130 (approx. 130 m$^2$/g), AEROSIL® 200 (approx. 200 m$^2$/g) and AEROSIL® 300 (approx. 300 m$^2$/g), all DEGUSSA AG, are used.

Examples: the pH of the predispersion can be between 2 and 4.5, as a result of the acidic nature of the pyrogenically produced silica and depending on the quality of the raw materials. If desired, the pH can be adjusted to be constant throughout the different silica batches by adding acid, e.g. aqueous hydrochloric acid, or base, e.g. aqueous ammonia solution, in order to achieve a constant grinding output.

During the grinding, a pH value of the predispersion close to the isoelectric point is advantageous, since the particles to be ground can be more readily ground in this case without having to overcome reciprocal electrostatic repelling forces. When alkaline pH values are being adjusted, it can be useful to pass through the area around pH 7 by rapid addition of the alkaline component.

In all the examples, a heating of the dispersion by the high energy input is countered by a heat exchanger, which limits the temperature increase to no more than 40° C.

Examples 1-3

Production of Acidic AEROSIL® 200 Dispersions at a Shear Rate of Approx. 20000 s$^{-1}$ 32.5 kg of deionised water are initially charged into a 60 l stainless steel mixing tank. Then, with the aid of the suction tube of the Ystral Conti-TDS 3 (stator slot: 4 mm ring and 1 mm ring, rotor/stator spacing approx. 1 mm) under shear conditions, the quantity of AEROSIL® 200 required for a predispersion of 13.0 wt. % (Example 1, comparative example), 24.0 wt. % (Example 2) and 28.5 wt. % (Example 3), corresponding to Table 1, is added.

Once the intake is complete, the suction nozzle is closed and shearing continues at 3000 rpm for a further 10 min. When the grinding is complete, deionised water is used to dilute to a concentration slightly higher than the desired end concentration to be able to take into account the quantities of additives still to be added.

The pH is adjusted to 5.3 with ammonia solution. On reaching the desired pH, the remainder of the water needed is metered in to achieve the exact silica end concentration of the dispersion of 12 wt. %. Using the Conti TDS 3, homogenisation is performed for a few more minutes.

Example 4

Production of an Acidic AEROSIL® 200 Dispersion at a Shear Rate of Approx. 25000 s$^{-1}$ 475 kg of deionised water are initially charged into a 1600 l stainless steel mixing tank. Then, with the aid of the suction tube of the Ystral Conti-TDS 4 (stator slot: 6 mm ring and 1 mm ring, rotor/stator spacing approx. 1 mm) under shear conditions, 190 kg of AEROSIL® 200 are taken in. Once the intake is complete, the suction nozzle is closed and the 28.5 wt. % predispersion is sheared at 3000 rpm for a further 10 min. The pH of the predispersion is approx. pH 3.7. When the grinding is complete, deionised water is used to dilute to a concentration slightly higher than the desired end concentration of the dispersion of 12 wt. % to be able to take into account the quantities of additives still to be added.

The pH is adjusted to 5.0 with ammonia solution. More deionised water is used to adjust the concentration of the dispersion to 12 wt. % silica and, using the Conti TDS 4, homogenisation is performed for a few more minutes. The thorough mixing/homogenisation is additionally supported by a jetstream mixer from Ystral installed in the mixing tank.

Example 5

Production of an Alkaline AEROSIL® 300 Dispersion at a Shear Rate of Approx. 25000 s$^{-1}$ 475 kg of deionised water are initially charged into a 1600 l stainless steel mixing tank. Then, with the aid of the suction tube of the Ystral Conti-TDS 4 (stator slot: 6 mm ring and 1 mm ring, rotor/stator spacing approx. 1 mm) under shear conditions, 190 kg of AEROSIL® 300 (or a smaller quantity according to the Table) are taken in. Once the intake is complete, the suction nozzle is closed and the 28.5 wt. % predispersion is sheared at 3000 rpm for a further 10 min. The pH of the predispersion is approx. 3.6. When the grinding is complete, deionised water is used to dilute to a concentration slightly higher than the desired end concentration of 15% to be able to take into account the quantities of additives still to be added.

The pH is adjusted to 9.5 by rapidly adding ammonia solution. The thorough mixing/homogenisation is additionally supported by a jetstream mixer from Ystral installed in the mixing tank. On reaching the desired pH of 9.5, more deionised water is used to adjust the concentration of the dispersion to 15 wt. % silica and, using the Conti TDS 4, homogenisation is performed for a few more minutes.

Examples 6-15

Production of AEROSIL® Dispersions Starting From a Predispersion of 35 wt. % and a Shear Rate of Approx. 20000 s$^{-1}$ 32.5 kg of deionised water are initially charged into a 60 l stainless steel mixing tank. Then, with the aid of the suction tube of the Ystral Conti-TDS 3 (stator slot: 4 mm ring and 1 mm ring, rotor/stator spacing approx. 1 mm) under shear conditions, 17.5 kg of pyrogenically produced silica according to Table 1 are taken in.

Once the intake is complete, the suction nozzle is closed and the 35 wt. % predispersion is sheared at 3000 rpm for a further 10 min (Example 14: 30 min). When the grinding is complete, deionised water is used to dilute to a concentration slightly higher than the desired end concentration to be able to take into account the quantities of additives still to be added.

The pH is adjusted to the desired level using sodium hydroxide or ammonia solution. On reaching the desired pH, the remainder of the water needed is metered in to achieve the exact silica end concentration.

Example 16

Production of an Acidic AEROSIL° 200 Dispersion Starting From a Predispersion with 21 wt. % in the Presence of an Aluminium Salt 43.5 kg of deionised water are initially charged into a 60 l stainless steel mixing tank. Then, with the aid of the suction tube of the Ystral Conti-TDS 3 (stator slot: 4 mm ring and 1 mm ring) under shear conditions, 11.6 kg of AEROSIL® 200 are sucked in. Once the intake is complete, the suction nozzle is closed and the 21 wt. % predispersion is sheared at 3000 rpm for a further 10 min.

After the grinding, an aqueous aluminium chloride solution is added (10 wt. %, based on $Al_2O_3$), so that, based on the quantity of AEROSIL® 200 used, a concentration of 0.01 mg $Al_2O_3$ per m$^2$ silica surface area is obtained. The pH of the dispersion is kept at a pH of between 3.8 and 4.5 by simultaneously adding 25 wt. % sodium hydroxide solution. After adding the required aluminium chloride solution, the pH is adjusted to 5.0 with the sodium hydroxide solution, the remainder of the deionised water needed is added to adjust the concentration of the dispersion to 20 wt. % and dispersing is continued for a further 5 minutes.

Example 17

Production of an Acidic AEROSIL® 200 Dispersion Starting From a Predispersion with 35 wt. % in the Presence of an Aluminium Salt 35.75 kg of deionised water are initially charged into a 60 l stainless steel mixing tank. Then, with the aid of the suction tube of the Ystral Conti-TDS 3 (stator slot: 4 mm ring and 1 mm ring) under shear conditions, 19.25 kg of AEROSIL® 200 are sucked in. Once the intake is complete, the suction nozzle is closed and the 35 wt. % predispersion is sheared at 3000 rpm for a further 10 min.

After the grinding, an aqueous aluminium chloride solution is added (10 wt. %, based on $Al_2O_3$), so that, based on the quantity of AEROSIL® 200 used, a concentration of 0.01 mg $Al_2O_3$ per m$^2$ silica surface area is obtained. The pH of the dispersion is kept at a pH of between 3.8 and 4.5 by simultaneously adding 25% sodium hydroxide solution. After adding the required aluminium chloride solution, the pH is adjusted to 5.0 with the sodium hydroxide solution, the remainder of the deionised water needed is added to adjust the concentration of the dispersion to 20 wt. % and dispersing is continued for a further 5 minutes.

Examples 1, 2, 3 and 6 show the importance of a high filling level during grinding. A high filling level during grinding with a rotor/stator set leads to a reduction in the viscosity of the dispersion.

Examples 3, 4 and 6 show the importance of the shear rate for successful grinding. At a higher shear rate, even with a low concentration of the predispersion, an equivalent product, or even a product with a slightly lower viscosity, can be achieved.

Examples 10, 11 and 12 show that, with a higher concentration of the silica, a higher viscosity is obtained.

Examples 13, 14 and 15 show that, in addition to the shear rate and the filling level during grinding, the period of grinding and the pH of the predispersion also have an influence. A longer grinding period brings about a lower viscosity of the dispersion. A reduction from pH 4.4 to 3.5 brings about a marked reduction in viscosity for the same grinding period.

Examples 16 and 17 show that the addition of aluminium salts clearly reduces the viscosity of dispersions containing silica. When the process according to the invention is applied with high shear rates, the viscosity of the dispersion can be reduced surprisingly markedly. This can be seen particularly clearly from Example 17.

TABLE 1

Dispersing parameters and physico-chemical data of the silica dispersions

| Ex. | AEROSIL | Predispersion wt. % | Predispersion pH | Shear rate (approx.) s⁻¹ | Dispersion wt. % | Additive | pH | $d_{50(V)}$ nm | Visc. 10 s⁻¹ mPas | Visc. 100 s⁻¹ mPas |
|---|---|---|---|---|---|---|---|---|---|---|
| 1 | 200 | 13.0 | 4.0 | 20000 | 12 | NH₄OH | 5.3 | 130 | 1615 | 320 |
| 2 | 200 | 24.0 | 3.8 | 20000 | 12 | NH₄OH | 5.3 | 130 | 50 | 32 |
| 3 | 200 | 28.5 | 3.7 | 20000 | 12 | NH₄OH | 5.3 | 137 | 35 | 24 |
| 4 | 200 | 28.5 | 3.7 | 25000 | 12 | NH₄OH | 5.0 | 128 | 9 | 8 |
| 5 | 300 | 28.5 | 3.6 | 25000 | 15 | NH₄OH | 9.5 | 131 | 9 | 9 |
| 6 | 200 | 35.0 | 3.5 | 20000 | 12 | NH₄OH | 5.3 | 104 | 12 | 11 |
| 7 | 200 | 35.0 | 3.5 | 20000 | 20 | NaOH | 10.0 | 81 | 40 | 35 |
| 8 | 200 | 35.0 | 3.5 | 20000 | 20 | NH₄OH | 10.0 | 86 | 38 | 32 |
| 9 | 300 | 35.0 | 3.3 | 20000 | 22 | NH₄OH | 10.3 | 91 | 70 | 53 |
| 10 | 90 | 35.0 | 4.0 | 20000 | 15 | NH₄OH | 5.3 | 154 | 6 | 5 |
| 11 | 90 | 35.0 | 4.0 | 20000 | 20 | NH₄OH | 5.3 | 155 | 26 | 15 |
| 12 | 90 | 35.0 | 4.0 | 20000 | 25 | NH₄OH | 5.3 | 160 | 40 | 23 |
| 13 | 130 | 35.0 | 4.4 | 20000 | 15 | NH₄OH | 5.3 | 165 | 39 | 20 |
| 14 | 130 | 35.0 | 4.4 | 20000 | 15 | NH₄OH | 5.3 | 158 | 21 | 14 |
| 15 | 130 | 35.0 | 3.5* | 20000 | 15 | NH₄OH | 5.3 | 155 | 7 | 6 |
| 16 | 200 | 21.0 | 3.9 | 20000 | 20 | NaOH, AlCl₃ | 5.0 | 108 | 385 | 164 |
| 17 | 200 | 35.0 | 3.5 | 20000 | 20 | NaOH, AlCl₃ | 5.0 | 88 | 8 | 8 |

*Predispersion adjusted to 3.5 with dilute HCl

The invention claimed is:

1. A process for the production of an aqueous dispersion of a pyrogenically produced silica powder with a BET surface area of between about 90 to 300 m²/g, with a silica content in the dispersion of between 5 and 25 wt. %, comprising the steps:
   water is introduced from a receiving vessel to a rotor/stator machine, wherein the water is optionally adjusted to pH values of between 2 and 4 by adding an acid, and
   silica powder is introduced, using a feed device, into the shear zone between the slots in the rotor teeth and the stator slots of the rotor/stator machine, continuously or discontinuously and with the rotor/stator machine running, in a quantity such that a predispersion having a pH of between 2 and 4.5, and with a solids content of between 20 and 35 wt. % results, and, after all the silica powder has been added,
   the feed device closes and shearing continues in such a way that the shear rate is in the range of between 10000 and 40000 s⁻¹, and
   then, by dilution, the predispersion is adjusted to the desired solids content of the dispersion while maintaining dispersing conditions,
   wherein the silica powder is not a doped silica powder.

2. The process according to claim 1, wherein a base or acid is added to the dispersion and/or predispersion.

3. The process according to claim 1, wherein a cationic polymer and/or an aluminium salt is added to the dispersion and/or predispersion.

4. The process according to claim 1, wherein a surface active substance is added to the dispersion and/or predispersion.

5. The process according to claim 1, wherein a preservative is added to the dispersion and/or predispersion.

6. The process according to claim 1, wherein the pH of the predispersion is between 2 and 3.9.

7. The process according to claim 1, wherein the pH of the predispersion is between 2 and 3.8.

8. The process according to claim 1, wherein the pH of the predispersion is between 2 and 3.7.

9. The process according to claim 1, wherein said adjusted to pH values of between 2 and 4 by adding an acid is carried out.

* * * * *